United States Patent
Paradis et al.

(10) Patent No.: US 7,806,487 B2
(45) Date of Patent: Oct. 5, 2010

(54) NOISELESS RUBBER TRACKS FOR TRACKED VEHICLES

(75) Inventors: Michel Paradis, Granby (CA); Stephane Pilette, Canton-de-Hatley (CA)

(73) Assignee: Camoplast Inc., Sherbrooke (CA)

( * ) Notice: Subject to any disclaimer, the term of this patent is extended or adjusted under 35 U.S.C. 154(b) by 0 days.

(21) Appl. No.: 11/857,955

(22) Filed: Sep. 19, 2007

(65) Prior Publication Data
US 2008/0073971 A1    Mar. 27, 2008

Related U.S. Application Data

(60) Provisional application No. 60/826,551, filed on Sep. 22, 2006.

(51) Int. Cl.
*B62D 55/096* (2006.01)
(52) U.S. Cl. .................................. 305/179; 305/167
(58) Field of Classification Search .............. 305/157, 305/158, 165, 167, 169, 178, 179, 181
See application file for complete search history.

(56) References Cited

U.S. PATENT DOCUMENTS

| | | | | |
|---|---|---|---|---|
| 3,118,709 A | * | 1/1964 | Case | 305/170 |
| 3,480,339 A | * | 11/1969 | Kell | 305/166 |
| 3,747,995 A | * | 7/1973 | Russ, Sr. | 305/179 |
| 3,917,360 A | * | 11/1975 | Gregoire, Marc | 305/168 |
| 5,709,440 A | | 1/1998 | Lecours | |
| 6,609,772 B2 | * | 8/2003 | Musselman et al. | 305/180 |
| 2003/0034189 A1 | * | 2/2003 | Lemke et al. | 180/116 |

FOREIGN PATENT DOCUMENTS

JP         63270293 A   * 11/1988
JP         S63-270293 A   11/1988

* cited by examiner

*Primary Examiner*—S. Joseph Morano
*Assistant Examiner*—Kip T Kotter
(74) *Attorney, Agent, or Firm*—Quarles & Brady LLP

(57) ABSTRACT

A rubber track for tracked vehicles, comprising a rubber belt with an inner surface and a ground-engaging surface, the ground-engaging surface comprising a series of traction lugs spaced apart in a longitudinal direction of the track at a first pitch, the inner surface provided with a series of drive lugs spaced apart in the longitudinal direction of the track at a second pitch, wherein the rubber belt comprises at most one reinforcing rod, embedded in a rubber material thereof and extending transversally substantially over an entire width of the track, at every two traction lugs.

76 Claims, 5 Drawing Sheets

NOISELESS RUBBER TRACKS FOR TRACKED VEHICLES

CROSS REFERENCE TO RELATED APPLICATIONS

This application claims the priority benefit of U.S. Provisional Patent Application No. 60/826,551, filed on Sep. 22, 2006. All documents above are herein incorporated by reference.

FIELD OF THE INVENTION

The present invention relates to tracked vehicles. More specifically, the present invention is concerned with noiseless rubber tracks for tracked vehicles.

BACKGROUND OF THE INVENTION

A track for a tracked vehicle typically comprises an endless drive belt trained around drive sprockets or wheels for driving the belt in an endless path.

As illustrated in FIG. 1 (PRIOR ART), the belt 12 has an inner surface 14 and a ground-engaging surface 16, which, as it passes along a lower run of the belt 12, engages a surface (not shown) to be traversed.

The ground-engaging surface 16 comprises a series of projecting and transversally extending traction lugs 20. The traction lugs 20 are regularly spaced apart in the longitudinal direction of the track at a pitch P.

Typically, the endless belt 12 is made of flexible rubber and reinforcing rods 24 are embedded in the rubber material of the body of the belt 12, at the same pitch spacing P, each of which extends transversally substantially over the entire width of the track. The thickness of the track is locally increased in the region of the embedded reinforcing rods, corresponding to the region of the traction lugs 20. Such reinforcing rods 24 provide transverse rigidity to the track.

The inner track surface 14 is typically provided with a wheel-engaging portion that engages a drive wheel (not shown). In this example, the wheel-engaging portion comprises a series of drive lugs 18, which are spaced along the length of the inside surface of the belt 12 at the same pitch P, for engaging drive wheels (not shown) as is well known in the art. In this case, individual ones of the reinforcing rods 24 are located, along the track's longitudinal direction, where respective ones of the drive lugs 18 are located.

Ongoing efforts are made in the field of tracked vehicles to try and reduce the overall noise level of this type of vehicles. The regularity of the pitch spacing of the various elements discussed hereinabove has been recognized as contributing to the overall noise level of tracked vehicles.

Therefore, it has been contemplated achieving noise reduction through non-uniform spacing of the lugs forming the thread of the ground-engaging surface. It has also been suggested to ensure that the spacing of the external ground engaging lugs is at a different pitch from the spacing of the internal drive lugs (see for example U.S. Pat. No. 5,709,440, incorporated by reference as if fully set forth herein).

There is still a need in the art for noiseless rubber tracks.

SUMMARY OF THE INVENTION

More specifically, there is provided a rubber track for a tracked vehicle, comprising a rubber belt with an inner surface and a ground-engaging surface, the ground-engaging surface comprising a series of traction lugs spaced apart in a longitudinal direction of the track at a first pitch, the inner surface provided with a series of drive lugs spaced apart in the longitudinal direction of the track at a second pitch, wherein the rubber belt comprises at most one reinforcing rod, embedded in a rubber material thereof and extending transversally substantially over an entire width of the track, at every two traction lugs.

There is further provided a tracked vehicle provided with a rubber track comprising a rubber belt with an inner surface and a ground-engaging surface, the ground-engaging surface comprising a series of traction lugs regularly spaced apart in a longitudinal direction of the track at a first pitch, the inner surface provided with a series of drive lugs spaced apart in the longitudinal direction of the track at a second pitch, wherein the rubber belt comprises at most one reinforcing rod, embedded in a rubber material thereof and extending transversally substantially over an entire width of the track, at every two traction lugs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 2A:
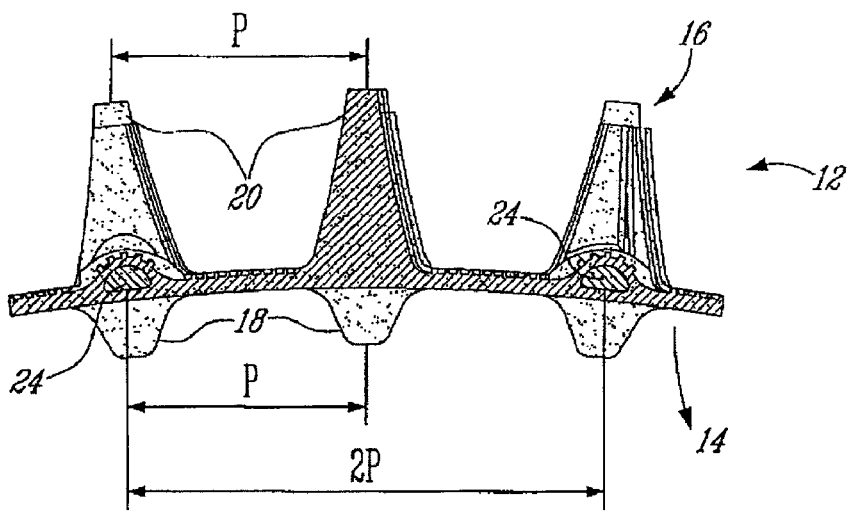
FIGS. 2A to 2C are sectional views of a portion of a track according to embodiments of the present invention; a) with a reinforcing rod at every two traction lugs; b) with no reinforcing rod; and c) with a reinforcing rod at every three traction lugs.

Turning to FIG. 2A of the appended drawings, a track according to an embodiment of the present invention will now be described.

Reinforcing rods 24 are embedded in the rubber material of the body of the belt 12, at a pitch spacing 2P multiple of the pitch spacing P of the traction lugs 20, each of which extends transversally over substantially the entire width of the track on the ground-engaging surface 16.

Figure 3:
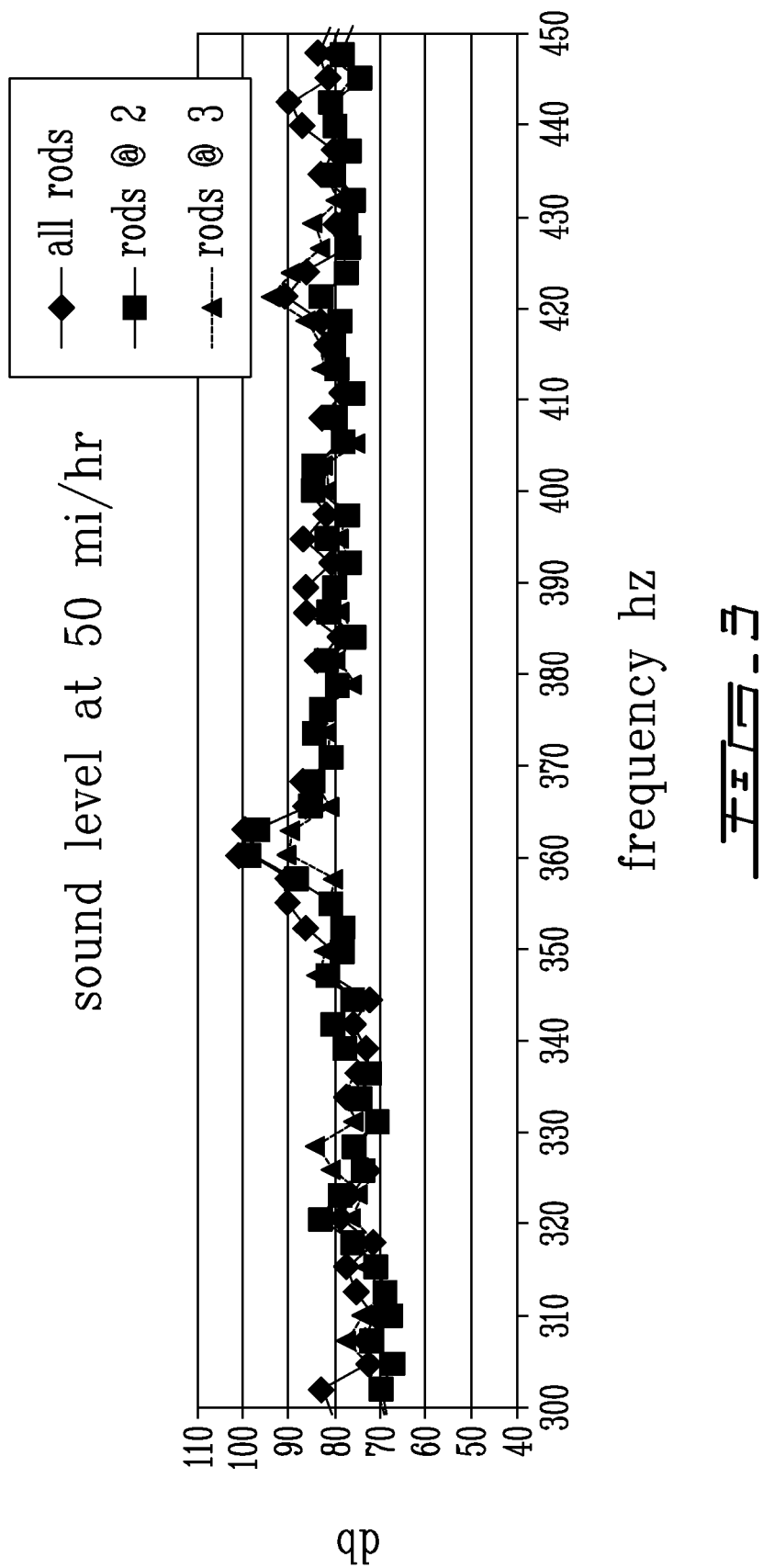
FIG. 3 is a graph of results of tests, of sound levels (in dB) versus frequency (in Hz), conducted on a track of the prior art (diamonds); on a first track according to an embodiment of the present invention (squares), and on a second track according to an embodiment of the present invention (triangles)

FIG. 3 shows the spectral analysis of the amplitude (in decibels) of the noise produced by a tracked vehicle operating at a speed of about 50 ml/hr, at different frequencies from 300 to 450 Hz. As may be seen, at 360 Hz, the noise generated when using a track as of the prior art, i.e. with reinforcing rods at every traction lug (diamonds in FIG. 3 and squares in FIGS.

Figure 1:
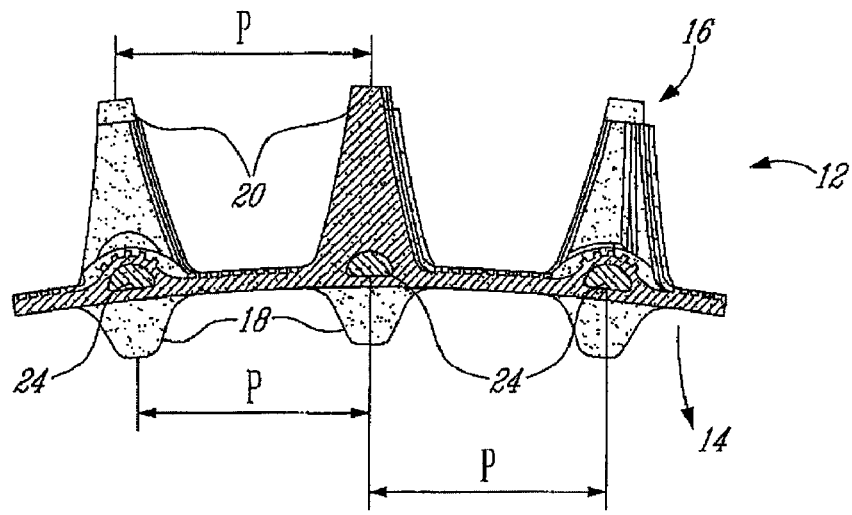
FIG. 1 is a longitudinal sectional view of a portion of a track as known in the art, viewed in a direction of the track.
Figure 2B:
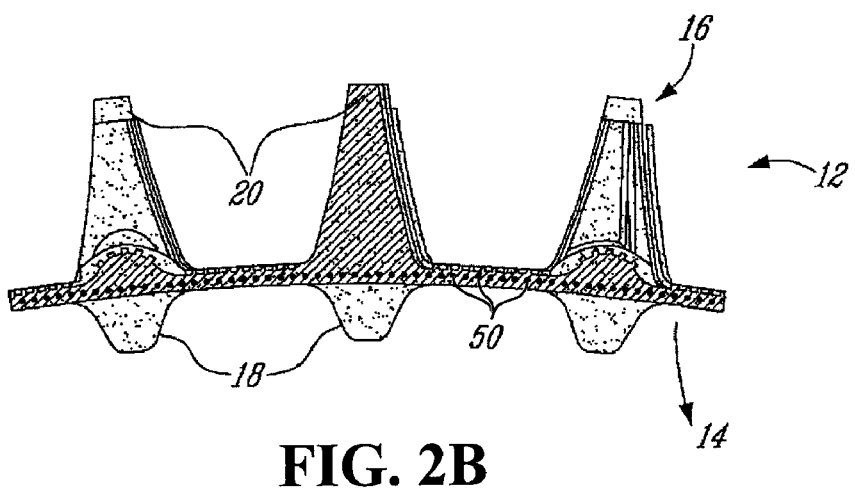
Figure 2C:
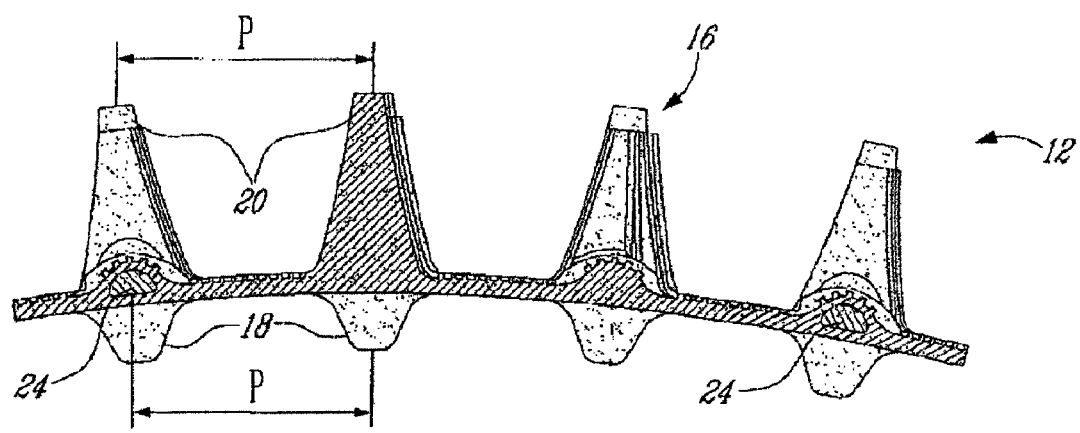
Figure 4:
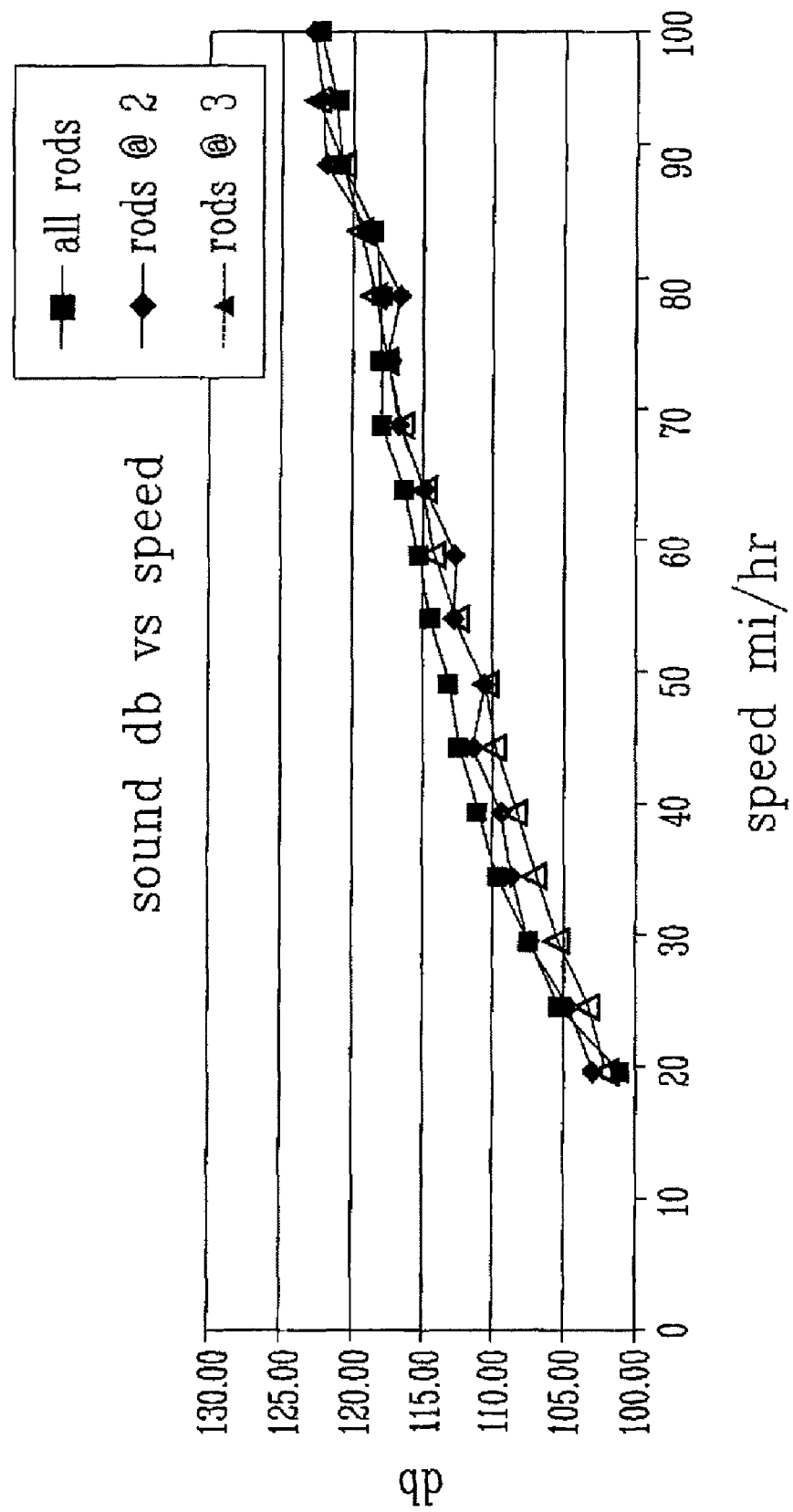
FIG. 4 is a graph of results of tests, of sound levels (in dB) versus speed (in mi/hr), conducted on a track of the prior art (squares); on a first track according to an embodiment of the present invention (diamonds), and on a second track according to an embodiment of the present invention (triangles)
Figure 5:
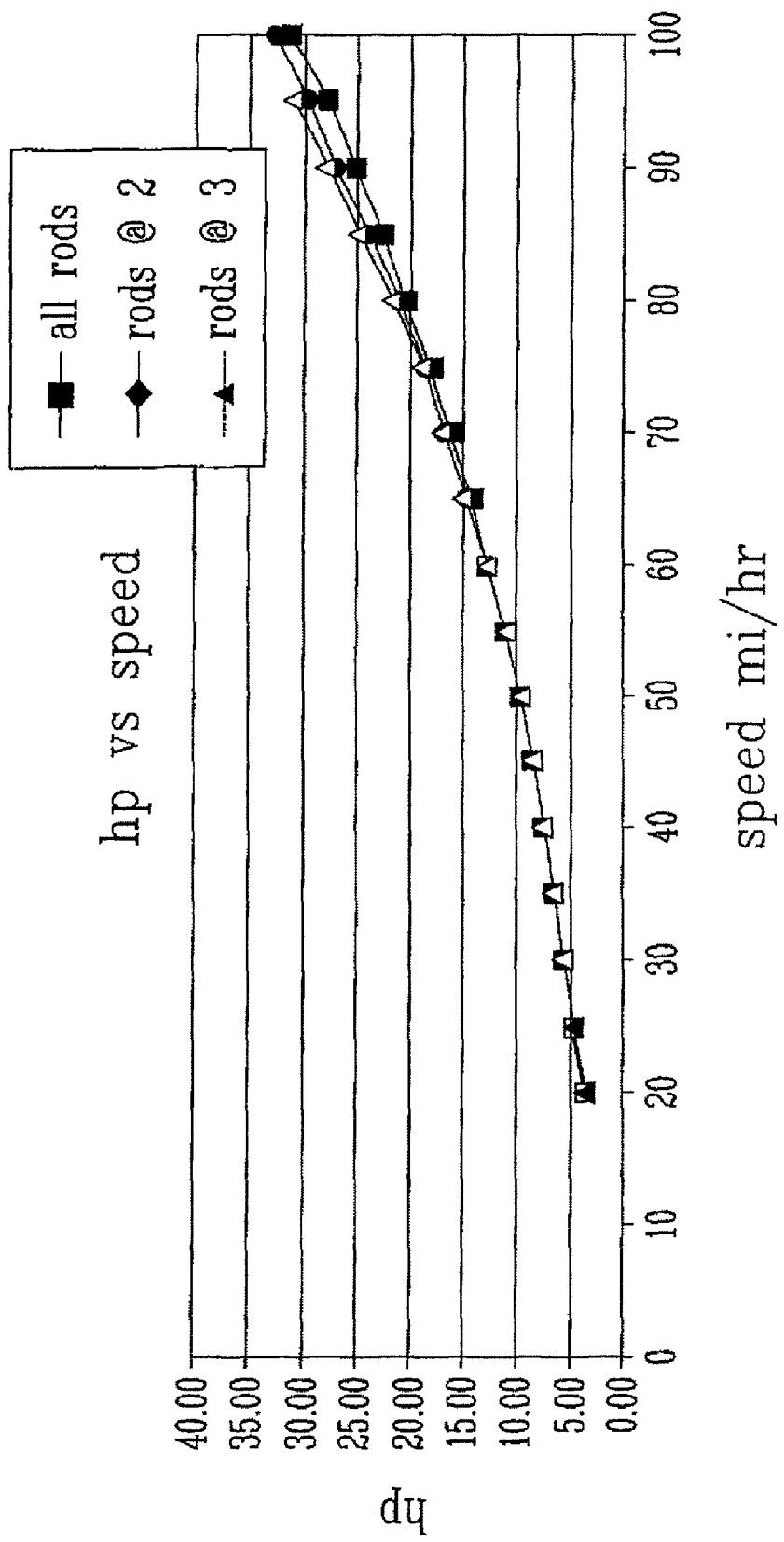
FIG. 5 is a graph of results of tests, of power (in hp) versus speed (in mi/hr), conducted on a track of the prior art (squares); on a first track according to an embodiment of the present invention (diamonds), and on a second track according to an embodiment of the present invention (triangles).

4 and 5), is of 101 dB, versus 99 dB (−2) when using a track according to an embodiment of the present invention with reinforcing rods only at every two traction lugs (squares in FIG. 3 and diamonds in FIGS. 4 and 5), and 90 dB (−11) when using a track according to an embodiment of the present invention with reinforcing rods only at every three traction lugs (triangles in FIGS. 3-5). In the track with a reinforcing rod at every traction lug (FIG. 1), the track with a reinforcing rod only at every two traction lugs (FIG. 2A), and the track with a reinforcing rod only at every three traction lugs (FIG. 2C), the traction lugs 20 are unchanged and the wheel-engaging portion, which comprises the drive lugs 18, is unchanged.

A track with no reinforcing rods (FIG. 2B) would see a noise reduction of up to 15 dB.

Moreover, resistance tests show that, contrary to a general thinking in the field, the rubber body, which, by construction, is flexible in its longitudinal direction, is sufficiently stiffened in the transverse direction by such reinforcing rods only present at every two (2) or three (3) traction lugs 20 for example.

In the case of no reinforcing rods, the chemical composition and the mechanical resistance of the rubber material reinforced with transverse fibers 50, for the endless belt 12 devoid of reinforcing rods, may be selected to ensure rigidity of the endless belt 12. Such rubber material, with a transverse rigidity much larger than its longitudinal rigidity, allows fabricating a belt with a transverse rigidity high enough for allowing traction of the vehicle, while having a smaller longitudinal rigidity allowing the belt to be driven around the sprocket wheel, thereby reducing resistance to forward movements. A transverse rigidity superior by about 5 to 10 duros to that of rubber usually used in rod-reinforced belts (of a hardness of typically about 60 duros) may be a target.

If any, the reinforcing rods may be fiberglass reinforced, as known in the art.

The present tracks allow reducing the level of generated noise. Moreover, since the number of reinforcement rods is reduced, the tracks are lighter in weight (for example by 1.45 kg based on a prior art track of 15.8 kg, based on a 15' large×121" long track for example). People in the art will further appreciate that the production time of such tracks is shortened by up to 10%, which further contributes to the decrease of costs.

As can be seen from FIGS. 4 and 5, the reduction in noise is achieved by using tracks of the present invention in tracked vehicles of about 17 hp at a speed of about 70 ml/hr. At upper speeds, it is found that the tracks with a reduced number of reinforcing rods are subject to increased vibration.

Such tracks are of particular interest for snowmobiles intended for use in protected environments, such as national parks for example, which have stringent regulations such as speed limits around 40 ml/hr and low noise impact.

Although the present invention has been described hereinabove by way of specific embodiments thereof, it can be modified, without departing from the nature and teachings of the subject invention as defined in the appended claims.

What is claimed is:

1. An endless track for fraction of a snowmobile, the endless track comprising:
    an inner side for facing a set of wheels of the snowmobile, the set of wheels comprising a drive wheel for imparting motion of the endless track;
    a ground-engaging outer side for engaging the ground, the ground-engaging outer side having traction projections spaced apart along a longitudinal direction of the endless track, each traction projection comprising elastomeric material that contacts the ground when the fraction projection contacts the ground; and
    reinforcing rods embedded between the inner side and the ground-engaging outer side, the reinforcing rods being spaced apart along the longitudinal direction of the endless track and extending transversally to the longitudinal direction of the endless track to provide transverse rigidity to the endless track,
    wherein, along the longitudinal direction of the endless track, a spacing of successive reinforcing rods is different from a spacing of successive traction projections such that, when the snowmobile is operated at a given speed, less noise is generated than if the inner side was unchanged and the ground-engaging outer side was unchanged but the spacing of successive reinforcing rods was identical to the spacing of successive traction projections.

2. An endless track as claimed in claim 1, the given speed being between 40 miles per hour and 60 miles per hour.

3. An endless track as claimed in claim 1, the given speed being 50 miles per hour.

4. An endless track as claimed in claim 1, the given speed being 50 miles per hour, wherein, when the snowmobile is operated at the given speed, a frequency spectrum of generated noise manifests a highest noise level that is less than if the inner side was unchanged and the ground-engaging outer side was unchanged but the spacing of successive reinforcing rods was identical to the spacing of successive traction projections.

5. An endless track as claimed in claim 4, the highest noise level being at least 2 dB less than if the inner side was unchanged and the ground-engaging outer side was unchanged but the spacing of successive reinforcing rods was identical to the spacing of successive traction projections.

6. An endless track as claimed in claim 4, the highest noise level being more than 2 dB less than if the inner side was unchanged and the ground-engaging outer side was unchanged but the spacing of successive reinforcing rods was identical to the spacing of successive traction projections.

7. An endless track as claimed in claim 4, the highest noise level being at a frequency between 300 Hz and 450 Hz.

8. An endless track as claimed in claim 1, the spacing of successive reinforcing rods being greater than the spacing of successive traction projections.

9. An endless track as claimed in claim 1, the spacing of successive reinforcing rods being at least twice the spacing of successive traction projections.

10. An endless track as claimed in claim 1, the spacing of successive reinforcing rods being no less than three times the spacing of successive traction projections.

11. An endless track as claimed in claim 1, the spacing of successive reinforcing rods being a multiple of the spacing of successive traction projections.

12. An endless track as claimed in claim 1, the inner side having wheel-contacting projections spaced apart along the longitudinal direction of the endless track, each wheel-contacting projection comprising elastomeric material that contacts a given one of the wheels when the wheel-contacting projection contacts the given one of the wheels.

13. An endless track as claimed in claim 12, the wheel-contacting projections being drive projections, the given one of the wheels being the drive wheel.

14. An endless track as claimed in claim 12, wherein, along the longitudinal direction of the endless track, the spacing of successive reinforcing rods is greater than a spacing of successive wheel-contacting projections.

15. An endless track as claimed in claim 14, the spacing of successive reinforcing rods being at least twice the spacing of successive wheel-contacting projections.

16. An endless track as claimed in claim 14, the spacing of successive reinforcing rods being no less than three times the spacing of successive wheel-contacting projections.

17. An endless track as claimed in claim 1, the elastomeric material of each traction projection comprising rubber.

18. A snowmobile comprising an endless track as claimed in claim 1.

19. An endless track for fraction of a snowmobile, the snowmobile comprising a track-engaging part for engaging the endless track, the track-engaging part of the snowmobile comprising a set of wheels, the set of wheels comprising a drive wheel for imparting motion of the endless track around the track-engaging part of the snowmobile, the endless track comprising:
- an inner side for facing the track-engaging part of the snowmobile, the inner side having inner projections spaced apart along a longitudinal direction of the endless track, each inner projection comprising elastomeric material that contacts the track-engaging part of the snowmobile when the inner projection contacts the track-engaging part of the snowmobile;
- a ground-engaging outer side for engaging the ground, the ground-engaging outer side having traction projections spaced apart along the longitudinal direction of the endless track, each traction projection comprising elastomeric material that contacts the ground when the traction projection engages the ground; and
- reinforcing rods embedded between the inner side and the ground-engaging outer side and spaced apart along the longitudinal direction of the endless track, the reinforcing rods extending transversally to the longitudinal direction of the endless track to provide transverse rigidity to the endless track;

wherein, along the longitudinal direction of the endless track: a reinforcing rod is located where an inner projection is located; a spacing of successive reinforcing rods is greater than a spacing of successive traction projections; and at least one inner projection and at least one traction projection are located between successive reinforcing rods.

20. An endless track as claimed in claim 19, wherein, when the snowmobile is operated at a given speed, less noise is generated than if the inner projections were unchanged and the traction projections were unchanged but the spacing of successive reinforcing rods was identical to the spacing of successive traction projections.

21. An endless track as claimed in claim 20, the given speed being 50 miles per hour.

22. An endless track as claimed in claim 19, wherein, when the snowmobile is operated at a speed of 50 miles per hour, a frequency spectrum of generated noise manifests a highest noise level that is less than if the inner projections were unchanged and the traction projections were unchanged but the spacing of successive reinforcing rods was identical to the spacing of successive traction projections.

23. An endless track as claimed in claim 22, the highest noise level being at least 2 dB less than if the inner projections were unchanged and the fraction projections were unchanged but the spacing of successive reinforcing rods was identical to the spacing of successive traction projections.

24. An endless track as claimed in claim 23, the highest noise level being more than 2 dB less than if the inner projections were unchanged and the traction projections were unchanged but the spacing of successive reinforcing rods was identical to the spacing of successive traction projections.

25. An endless track as claimed in claim 22, the highest noise level being at a frequency between 300 Hz and 450 Hz.

26. An endless track as claimed in claim 19, the spacing of successive reinforcing rods being at least twice the spacing of successive traction projections.

27. An endless track as claimed in claim 26, the spacing of successive reinforcing rods being no less than three times the spacing of successive traction projections.

28. An endless track as claimed in claim 19, the spacing of successive reinforcing rods being a multiple of the spacing of successive traction projections.

29. An endless track as claimed in claim 19, the inner projections comprising wheel-contacting projections for engaging the set of wheels.

30. An endless track as claimed in claim 29, the wheel-contacting projections comprising drive projections for engaging the drive wheel.

31. An endless track as claimed in claim 19, wherein, along the longitudinal direction of the endless track, the spacing of successive reinforcing rods is greater than a spacing of successive inner projections.

32. An endless track as claimed in claim 31, the spacing of successive reinforcing rods being at least twice the spacing of successive inner projections.

33. An endless track as claimed in claim 19, the elastomeric material comprising rubber.

34. An endless track for traction of a snowmobile, the endless track comprising:
- an inner side for engaging a plurality of wheels of the snowmobile, the inner side comprising a plurality of wheel-contacting projections, each wheel-contacting projection comprising elastomeric material that contacts a given one of the wheels when the wheel-contacting projection contacts the given one of the wheels;
- a ground-engaging outer side for engaging the ground, the ground-engaging outer side comprising a plurality of traction projections spaced apart along a longitudinal direction of the endless track; and
- a plurality of reinforcing rods embedded in the endless track, the reinforcing rods being spaced apart along the longitudinal direction of the endless track and extending transversally to the longitudinal direction of the endless track to provide transverse rigidity to the endless track, wherein, along the longitudinal direction of the endless track: a given one of the reinforcing rods is located, where a given one of the wheel-contacting projections is located; a spacing of successive ones of the reinforcing rods is greater than a spacing of successive ones of the traction projections; and at least one of the traction projections and at least one of the wheel-contacting projections are located between successive ones of the reinforcing rods.

35. An endless track as claimed in claim 34, the spacing of successive ones of the reinforcing rods being sufficiently greater than the spacing of successive ones of the traction projections such that, when the snowmobile is operated at a speed of 50 miles per hour, a frequency spectrum of generated noise manifests a highest noise level that is less than if the wheel-contacting projections were unchanged and the traction projections were unchanged but the spacing of successive ones of the reinforcing rods was identical to the spacing of successive ones of the traction projections.

36. An endless track as claimed in claim 35, the highest noise level being at least 2 dB less than if the wheel-contacting projections were unchanged and the traction projections were unchanged but the spacing of successive ones of the reinforcing rods was identical to the spacing of successive ones of the traction projections.

37. An endless track as claimed in claim 35, the highest noise level being more than 2 dB less than if the wheel-contacting projections were unchanged and the traction projections were unchanged but the spacing of successive ones of the reinforcing rods was identical to the spacing of successive ones of the traction projections.

38. An endless track as claimed in claim 35, the highest noise level being at a frequency between 300 Hz and 450 Hz.

39. An endless track as claimed in claim 34, wherein, along the longitudinal direction of the endless track, more than one of the traction projections are located between successive ones of the reinforcing rods and more than one of the wheel-contacting projections are located between successive ones of the reinforcing rods.

40. An endless track as claimed in claim 34, the spacing of successive ones of the reinforcing rods being at least twice the spacing of successive ones of the traction projections.

41. An endless track as claimed in claim 40, the spacing of successive ones of the reinforcing rods being no less than three times the spacing of successive ones of the traction projections.

42. An endless track as claimed in claim 34, the spacing of successive ones of the reinforcing rods being a multiple of the spacing of successive ones of the traction projections.

43. An endless track as claimed in claim 34, the given one of the reinforcing rods being a first given one of the reinforcing rods, the given one of the wheel-contacting projections being a first given one of the wheel-contacting projections, wherein, along the longitudinal direction of the endless track, a second given one of the reinforcing rods is located where a second given one of the wheel-contacting projections is located.

44. An endless track as claimed in claim 34, the given one of the wheels being a drive wheel for imparting motion to the endless track, the wheel-contacting projections being drive projections spaced apart along the longitudinal direction of the endless track.

45. An endless track as claimed in claim 44, wherein, along the longitudinal direction of the endless track, the spacing of successive ones of the reinforcing rods is greater than a spacing of successive ones of the drive projections.

46. An endless track as claimed in claim 45, the spacing of successive ones of the reinforcing rods being at least twice the spacing of successive ones of the drive projections.

47. An endless track as claimed in claim 34, the elastomeric material comprising rubber.

48. A snowmobile comprising an endless track as claimed in claim 34.

49. An endless track for traction of a snowmobile, the endless track comprising:
an inner side for engaging a plurality of wheels of the snowmobile, the wheels including a drive wheel for imparting motion to the endless track, the inner side comprising a wheel-engaging portion for engaging the drive wheel, the wheel-engaging portion comprising rubber material that contacts the drive wheel when the wheel-engaging portion engages the drive wheel;
a ground-engaging outer side for engaging the ground, the ground-engaging outer side comprising a plurality of traction lugs projecting outwardly and spaced apart along a longitudinal direction of the endless track; and
a plurality of reinforcing rods at embedded in the endless track, the reinforcing rods being spaced apart along the longitudinal direction of the endless track and extending transversally to the longitudinal direction of the endless track to provide transverse rigidity to the endless track, wherein, along the longitudinal direction of the endless track, a spacing of successive ones of the reinforcing rods is sufficiently different from a spacing of successive ones of the traction lugs such that, when the snowmobile is operated at a speed of 50 miles per hour, a frequency spectrum of generated noise manifests a highest noise level that is at least 2 dB less than if the wheel-engaging portion was unchanged and the traction lugs were unchanged but the spacing of successive ones of the reinforcing rods was identical to the spacing of successive ones of the traction lugs.

50. An endless track as claimed in claim 49, the spacing of successive ones of the reinforcing rods being greater than the spacing of successive ones of the traction lugs.

51. An endless track as claimed in claim 50, the spacing of successive ones of the reinforcing rods being at least twice the spacing of successive ones of the traction lugs.

52. An endless track as claimed in claim 51, the spacing of successive ones of the reinforcing rods being no less than three times the spacing of successive ones of the traction lugs.

53. An endless track as claimed in claim 50, the spacing of successive ones of the reinforcing rods being a multiple of the spacing of successive ones of the traction lugs.

54. An endless track as claimed in claim 49, the highest noise level being at a frequency between 300 Hz and 450 Hz.

55. An endless track as claimed in claim 54, the frequency of the highest noise level being between 330 Hz and 420 Hz.

56. An endless track as claimed in claim 55, the frequency of the highest noise level being between 350 Hz and 400 Hz.

57. An endless track as claimed in claim 49, each of the reinforcing rods being aligned with a respective one of the traction lugs.

58. An endless track as claimed in claim 49, the wheel-engaging portion comprising a plurality of drive lugs projecting inwardly and spaced apart along the longitudinal direction of the endless track.

59. An endless track as claimed in claim 58, wherein, along the longitudinal direction of the endless track, the spacing of successive ones of the reinforcing rods is greater than a spacing of successive ones of the drive lugs.

60. An endless track as claimed in claim 59, the spacing of successive ones of the reinforcing rods being at least twice the spacing of successive ones of the drive lugs.

61. An endless track as claimed in claim 58, each of the reinforcing rods being aligned with a respective one of the traction lugs and a respective one of the drive lugs.

62. An endless track as claimed in claim 61, each of the traction lugs having a height that is substantially greater than a height of a given one of the drive lugs with which it is aligned.

63. An endless track as claimed in claim 49, the reinforcing rods being reinforced with fiberglass.

64. A snowmobile comprising an endless track as claimed in claim 49.

65. An endless track as claimed in claim 49, the highest noise level being more than 2 dB less than if the wheel-engaging portion was unchanged and the traction lugs were unchanged but the spacing of successive ones of the reinforcing rods was identical to the spacing of successive ones of the traction lugs.

66. A method for manufacturing an endless track for a snowmobile with a reduced noise profile, the endless track comprising: an inner side for engaging a plurality of wheels of the snowmobile, the wheels including a drive wheel for imparting motion to the endless track, the inner side comprising a wheel-engaging portion for engaging the drive wheel, the wheel-engaging portion comprising rubber material that contacts the drive wheel when the wheel-engaging portion engages the drive wheel; a ground-engaging outer side for engaging the ground, the ground-engaging outer side comprising a plurality of traction lugs projecting outwardly and spaced apart along a longitudinal direction of the endless track; and a plurality of reinforcing rods embedded in the endless track, the reinforcing rods being spaced apart along the longitudinal direction of the endless track and extending transversally to the longitudinal direction of the endless track to provide transverse rigidity to the endless track, the method comprising:

a. designing the structure of the endless track, the designing including selecting the pitch of the reinforcing rods with relation to the pitch of the traction lugs such that, when the snowmobile is operated at a speed of 50 miles per hour, the frequency spectrum of noise produced manifests a highest noise level that is at least 2 dB less than if the wheel-engaging portion was unchanged and the traction lugs were unchanged but the pitch of the reinforcing rods was the same as the pitch of the traction lugs; and b. manufacturing the endless track according to the designing.

67. A method as defined in claim 66, wherein the highest noise level is found in the frequency range between 300 Hz and 450 Hz.

68. A method as defined in claim 67, wherein the highest noise level is found in the frequency range between 330 Hz and 420 Hz.

69. A method as defined in claim 66, wherein the selecting includes selecting the pitch of the reinforcing rods such that it is larger than the pitch of the traction lugs.

70. A method as defined in claim 69, wherein the selecting includes selecting the pitch of the reinforcing rods such that it is at least twice the pitch of the traction lugs.

71. A method as defined in claim 70, wherein the selecting includes selecting the pitch of the reinforcing rods such that it is no less than three times the pitch of the traction lugs.

72. A method as defined in claim 69, wherein the selecting includes selecting the pitch of the reinforcing rods such that it is a multiple of the pitch of the traction lugs.

73. A method as defined in claim 66, wherein the designing includes choosing the location of the reinforcing rods with respect to the traction lugs such that each reinforcing rod is aligned with a traction lug.

74. A method as defined in claim 66, the wheel-engaging portion comprising a plurality of drive lugs projecting inwardly and spaced apart along the longitudinal direction of the endless track.

75. A method for reducing a highest noise level in a frequency spectrum of noise produced when a snowmobile is operated at a speed of 50 miles per hour, the snowmobile comprising an endless track that comprises: an inner side for engaging a plurality of wheels of the snowmobile, the wheels including a drive wheel for imparting motion to the endless track, the inner side comprising a wheel-engaging portion for engaging the drive wheel, the wheel-engaging portion comprising rubber material that contacts the drive wheel when the wheel-engaging portion engages the drive wheel; a ground-engaging outer side for engaging the ground, the ground-engaging outer side comprising a plurality of traction lugs projecting outwardly and spaced apart along a longitudinal direction of the endless track; and a plurality of reinforcing rods embedded in the endless track, the reinforcing rods being spaced apart along the longitudinal direction of the endless track and extending transversally to the longitudinal direction of the endless track to provide transverse rigidity to the endless track, the method comprising:

a. designing the structure of the endless track, the designing including selecting the pitch of the reinforcing rods such that the pitch of the reinforcing rods exceeds the pitch of the traction lugs by a degree sufficient to reduce the highest noise level by at least 2 dB in comparison to that which would be produced if the wheel-engaging portion was unchanged and the traction lugs were unchanged but the pitch of the reinforcing rods was the same as the pitch of the traction lugs;

b. manufacturing the endless track according to the designing;

c. installing the endless track on a snowmobile; and d. driving the snowmobile at a speed of 50 miles per hour.

76. A method as defined in claim 75, the wheel-engaging portion comprising a plurality of drive lugs projecting inwardly and spaced apart along the longitudinal direction of the endless track.

* * * * *

UNITED STATES PATENT AND TRADEMARK OFFICE
CERTIFICATE OF CORRECTION

| | | |
|---|---|---|
| PATENT NO. | : 7,806,487 B2 | Page 1 of 1 |
| APPLICATION NO. | : 11/857955 | |
| DATED | : October 5, 2010 | |
| INVENTOR(S) | : Michel Paradis and Stephane Pilette | |

It is certified that error appears in the above-identified patent and that said Letters Patent is hereby corrected as shown below:

In the Claims:

- Claim 1, line 1: "fraction" should be "traction";

- Claim 1, line 10: "fraction" should be "traction";

- Claim 19, line 1: "fraction" should be "traction";

- Claim 23, line 3: "fraction" should be "traction";

- Claim 34, line 19: the "," between "located" and "where" should be deleted; and

- Claim 49, line 14: the term "at" between "rods" and "embedded" should be deleted.

Signed and Sealed this
Twelfth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,806,487 B2  
APPLICATION NO. : 11/857955  
DATED : October 5, 2010  
INVENTOR(S) : Michel Paradis and Stephane Pilette Page 1 of 1

It is certified that error appears in the above-identified patent and that said Letters Patent is hereby corrected as shown below:

In the Claims:

Column 3, line 59 (Claim 1, line 1) "fraction" should be "traction";

Column 4, line 1 (Claim 1, line 10) "fraction" should be "traction";

Column 5, line 8 (Claim 19, line 1) "fraction" should be "traction";

Column 5, line 58 (Claim 23, line 3) "fraction" should be "traction";

Column 6, line 43 (Claim 34, line 19) the "," between "located" and "where" should be deleted; and Column 7, line 60 (Claim 49, line 14) the term "at" between "rods" and "embedded" should be deleted.

This certificate supersedes the Certificate of Correction issued April 12, 2011.

Signed and Sealed this  
Tenth Day of May, 2011

David J. Kappos  
*Director of the United States Patent and Trademark Office*